(12) United States Patent
Noguchi

(10) Patent No.: US 6,724,541 B2
(45) Date of Patent: Apr. 20, 2004

(54) APERTURE REGULATING APPARATUS

(75) Inventor: Yukio Noguchi, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/385,430

(22) Filed: Mar. 12, 2003

(65) Prior Publication Data

US 2003/0174412 A1 Sep. 18, 2003

(30) Foreign Application Priority Data

Mar. 15, 2002 (JP) ........................ 2002-071585

(51) Int. Cl.[7] .................... G02B 15/14; G02B 7/02; G02B 9/00
(52) U.S. Cl. .................. 359/700; 359/701; 359/823; 359/739
(58) Field of Search ............... 359/694, 699, 359/700, 701, 704, 823, 738, 739, 740

(56) References Cited

U.S. PATENT DOCUMENTS 6,222,684 B1 * 4/2001 Nishimura .................. 359/740
6,501,909 B1 * 12/2002 Nishimura et al. ........... 396/74

FOREIGN PATENT DOCUMENTS

| JP | 3-107132 | 5/1991 |
| JP | 2000-235209 | 8/2000 |
| JP | 2000-352657 | 12/2000 |

* cited by examiner

Primary Examiner—Ricky Mack
(74) Attorney, Agent, or Firm—Young & Thompson

(57) ABSTRACT

An aperture regulating apparatus includes a moving barrel moving straight in an optical axis direction, a rotation barrel rotatably held by the moving barrel, a cam member movably fitted on the moving barrel, and a shutter unit movably contained in the moving barrel. In moving the moving barrel in the optical axis direction by magnifying operation, the rotation barrel moves in the optical axis direction with the moving barrel with rotation, and the cam member moves in the optical axis direction on an outer surface of the moving barrel in accordance with rotation of the rotation barrel. The shutter unit has a regulation lever getting in rotational range of shutter blades. The regulation lever is displaced according to movement of the cam member to control a rotational amount of the shutter blades. An aperture size is regulated according to a focal length of a taking lens.

10 Claims, 16 Drawing Sheets

APERTURE REGULATING APPARATUS

BACKGROUND OF THE INVENTION

1. Field of the Invention

The present invention relates to an aperture regulating apparatus for changing the aperture size in accordance with the focal length of a taking lens.

2. Background Arts

A low-priced shutter mechanism (a program shutter) which is also used as an aperture stop with a moving-magnet motor is generally known. The motor opens and closes a shutter blade, by means of making a rotor of a permanent magnet reciprocate within a range of a predetermined angle, in response to a current direction flowing in a coil. The moving-magnet motor is inexpensive as compared to a pulse motor, but it cannot control the aperture size precisely in accordance with an exposure value. In order to realize the proper exposure value, the shutter mechanism is equipped with a regulation device for regulating a rotational range of the shutter blade so as to control the exposure time.

If a zoom lens is used with the shutter mechanism which controls the exposure time in accordance with the exposure value, brightness of the zoom lens differs between a wide-angle side and a telephoto side. Hence, it is necessary to make the aperture size in the wide-angle side smaller than that in the telephoto side. Furthermore, the small aperture size is preferable in the wide-angle side, for the purpose of reducing blurriness of the edge of an image frame caused by spherical aberration of the lens. From this point of view, U.S. Pat. No. 6,222,684 (corresponding to Japanese Patent Laid-Open Publication No. 2000-235209) and Japanese Patent Laid-Open Publication No. 2000-352657 disclosed aperture regulating apparatuses for a zoom lens which changes a maximum aperture size formed by shutter blades in accordance with the focal length of the zoom lens.

The aperture regulating apparatus according to U.S. Pat. No. 6,222,684 has a moving barrel for holding a lens group and a program shutter doubling as an aperture stop, and a rotation barrel held on an outer periphery of the moving barrel. The rotation barrel moves in an optical axis direction in response to magnifying. One end portion of a driving lever for operating the shutter blades protrudes outside from the program shutter. A cam inclined to the optical axis direction is provided inside the rotation barrel. Upon zooming within a predetermined range on a wide-angle side, the end portion of the driving lever is engaged with the cam to regulate a rotational range of the driving lever. Thus, the aperture size is regulated in the predetermined zooming range in accordance with the focal length of the taking lens.

The aperture regulating apparatus according to Japanese Patent Laid-Open Publication No. 2000-352657 has a moving barrel for holding a lens group and a program shutter, and a straight guide frame for preventing rotation of the moving barrel. A cam is formed in the straight guide frame. In response to magnifying, the straight guide frame and the moving barrel relatively moves in an optical axis direction. Such relative movement causes the cam to push the regulation lever for regulating the movement of the shutter blades, so that the aperture size is regulated.

In the aperture regulating apparatuses described above, however, movement of the rotation barrel or the straight guide frame in the optical axis direction with zooming changes an overlap area between the moving barrel and the rotation barrel, or between the moving barrel and the straight guide frame. It is possible to engage the part of the driving lever or the regulation lever with the cam in the wide-angle side because the overlap area is wide therein, but it becomes impossible in the telephoto side because the overlap area is narrow therein. To realize the engagement in the telephoto side, the rotation barrel or the straight guide frame may be extended to the optical axis direction. In this case, however, length of a lens barrel becomes long along the optical axis direction. Such aperture regulating apparatus, if assembled in a camera containing the lens barrel inside the camera body, causes an increase in thickness of the camera body, which adversely affects miniaturization of the camera.

SUMMARY OF THE INVENTION

An object of the present invention is to provide an aperture regulating apparatus which can regulate the aperture size in the whole zooming range.

Another object of the present invention is to provide an aperture regulating apparatus with compact structure.

To achieve the above objects, an aperture regulating apparatus according to the present invention comprises a moving barrel that moves straight in an optical axis direction, a rotation barrel movably held by the moving barrel, a cam member fitted on an outer surface of the moving barrel, a shutter unit contained inside the moving barrel, and a regulation lever engaged with the cam member. When the moving barrel moves in the optical axis direction, the rotation barrel moves in the optical axis direction with the moving barrel and rotates due to the straight movement of the moving barrel. The cam member moves straight in the optical axis direction relative to the moving barrel in accordance with the rotation of the rotation barrel. The shutter unit has shutter blades. The regulation lever is displaced in accordance with a movement of the cam member to regulate the range of movement of the shutter blades. An aperture size is changed by the regulation.

A first cam groove is formed in an inner surface of the rotation barrel, and a projection fitted into the first cam groove is provided on the cam member. When the rotation barrel rotates, the first cam groove and the projection move the cam member in the optical axis direction.

Plural cam steps are formed in the cam member. A position of the regulation lever is regulated within plural steps depending on a position of the cam member against the moving barrel.

The aperture regulating apparatus further comprises at least one second cam groove formed in an inner surface of the rotation barrel, at least one guide opening formed in a periphery of the moving barrel along the optical axis direction, and at least one cam follower provided in the shutter unit. The cam follower is fitted into the second cam groove through the guide opening, so that the shutter unit moves in the optical axis direction when the rotation barrel rotates.

The first cam groove and the second cam groove may be connected with each other in the inner surface of the rotation barrel. Three of the second cam grooves may be formed in rotational symmetrical positions.

The aperture size determined in magnifying is kept constant during the focusing operation of a taking lens optical system.

The taking lens optical system comprises a lens group moving in the optical axis direction together with the shutter unit. The shutter unit moves in the optical axis direction while keeping a distance from the cam member during the focusing operation of the taking lens optical system, so that the position of the lens group is changed in the taking lens optical system.

The regulation lever is movably held inside the shutter unit. A first end of the regulation lever protruding outside from the shutter unit is engaged with the cam member. The regulation lever rotates within a vertical plane to the optical axis direction when the cam member moves in the optical axis direction.

A second end of the regulation lever gets in range of movement of the shutter blade. The position of the second end is changed in accordance with an amount of rotation of the regulation lever to control an amount of rotation of the shutter blades.

BRIEF DESCRIPTION OF THE DRAWINGS

The above objects and advantages of the present invention will become apparent from the following detailed descriptions of the preferred embodiments when read in association with the accompanying drawings, which are given by way of illustration only and thus do not limit the present invention. In the drawings, the same reference numerals designate like or corresponding parts throughout the several views, and wherein.

DETAILED DESCRIPTION OF THE EMBODIMENTS

Figure 1:
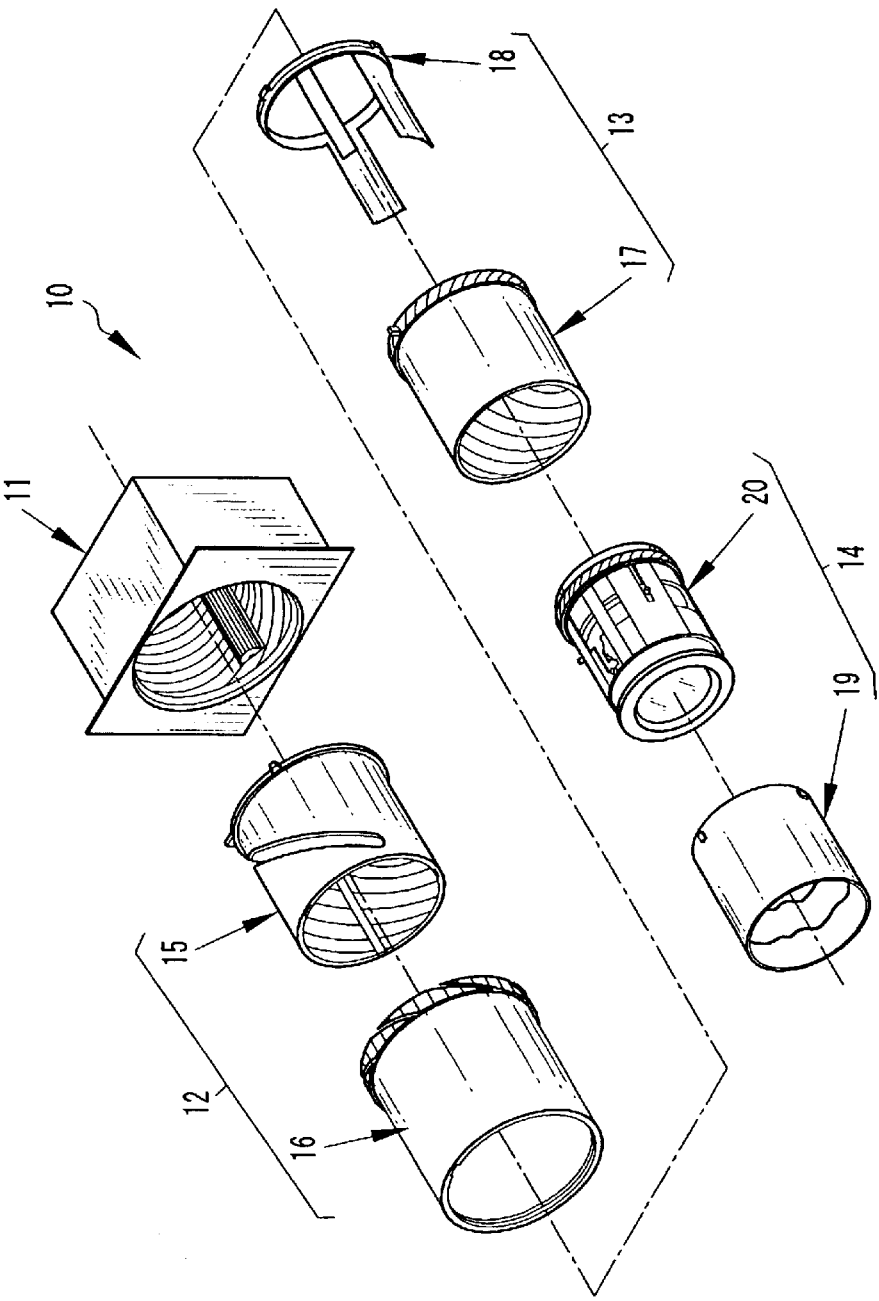
FIG. 1 is an exploded perspective view of a zoom-lens barrel.

Referring to FIG. 1, a zoom-lens barrel 10 having an aperture regulating apparatus according to the present invention comprises a fixed barrel 11 and three barrels forwardly protruding from the fixed barrel 11 in zooming, namely, a rear barrel 12, a middle barrel 13, and a front barrel 14. The rear barrel 12 has a straight barrel 15 and a rear rotation barrel 16. The middle barrel 13 has a middle rotation barrel 17 and a straight guide frame 18, and the front barrel 14 has a front rotation barrel 19 and a moving barrel 20.

Figure 2:
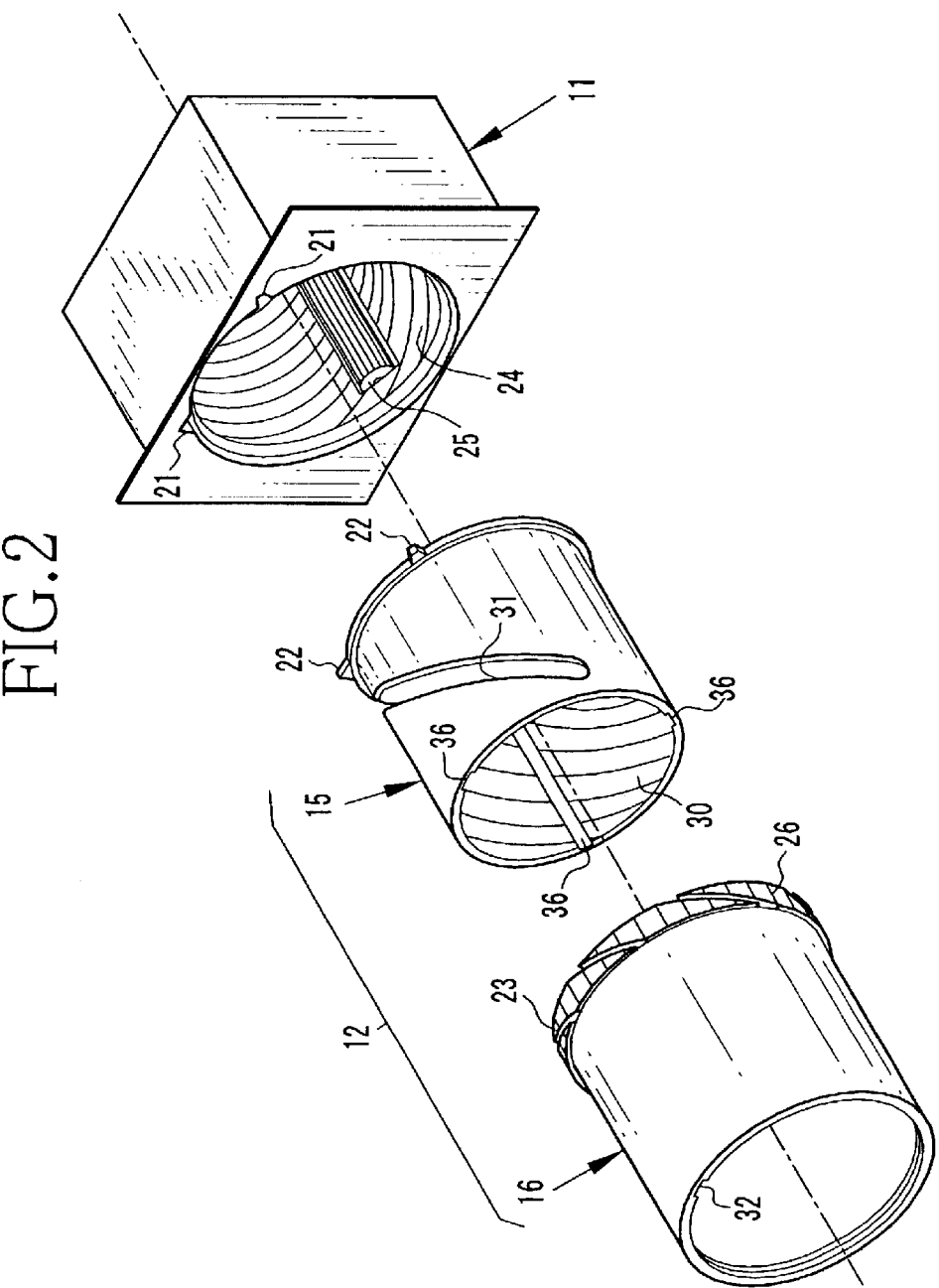
FIG. 2 is a perspective view of a fixed barrel and a rear barrel.

Referring to FIG. 2, the fixed barrel 11 movably holds the straight barrel 15 in an optical axis direction that is parallel to the optical axis of the zoom-lens barrel 10. Key projections 22 formed on the rear end of the straight barrel 15 are fitted into key grooves 21 formed in the fixed barrel 11 in order to prevent the straight barrel 15 from rotating.

The rear rotation barrel 16 is movably held in an outer periphery of the straight-ahead barrel 16. A male helicoid 23 formed on the rear end of the outer periphery of the rear rotation barrel 16 is in mesh with a female helicoid 24 formed in the inner periphery of the fixed barrel 11 to change the rotation of the rear rotation barrel 16 into the movement of the straight barrel 15 in the optical axis direction.

A lens drive motor provided inside a camera body is driven when zooming and focusing. Rotation of the motor is transmitted to a longitudinal gear 25 provided in the fixed barrel 11. The longitudinal gear 25 exposed through an opening formed in an inner surface of the fixed barrel 11 is engaged with a gear train 26 formed on an outer periphery of the male helicoid 23 of the rear rotation barrel 16. Upon driving the lens drive motor, the rear rotation barrel 16 rotates while holding the straight barrel 15 inside, and protrudes from the fixed barrel 11 in the optical axis direction with the straight barrel 15. Since the longitudinal gear 25 is wide in the optical axis direction, the longitudinal gear 25 is not disengaged with the gear train 26 even when the rear rotation barrel 16 moves back and forth in the optical axis direction.

Figure 3:
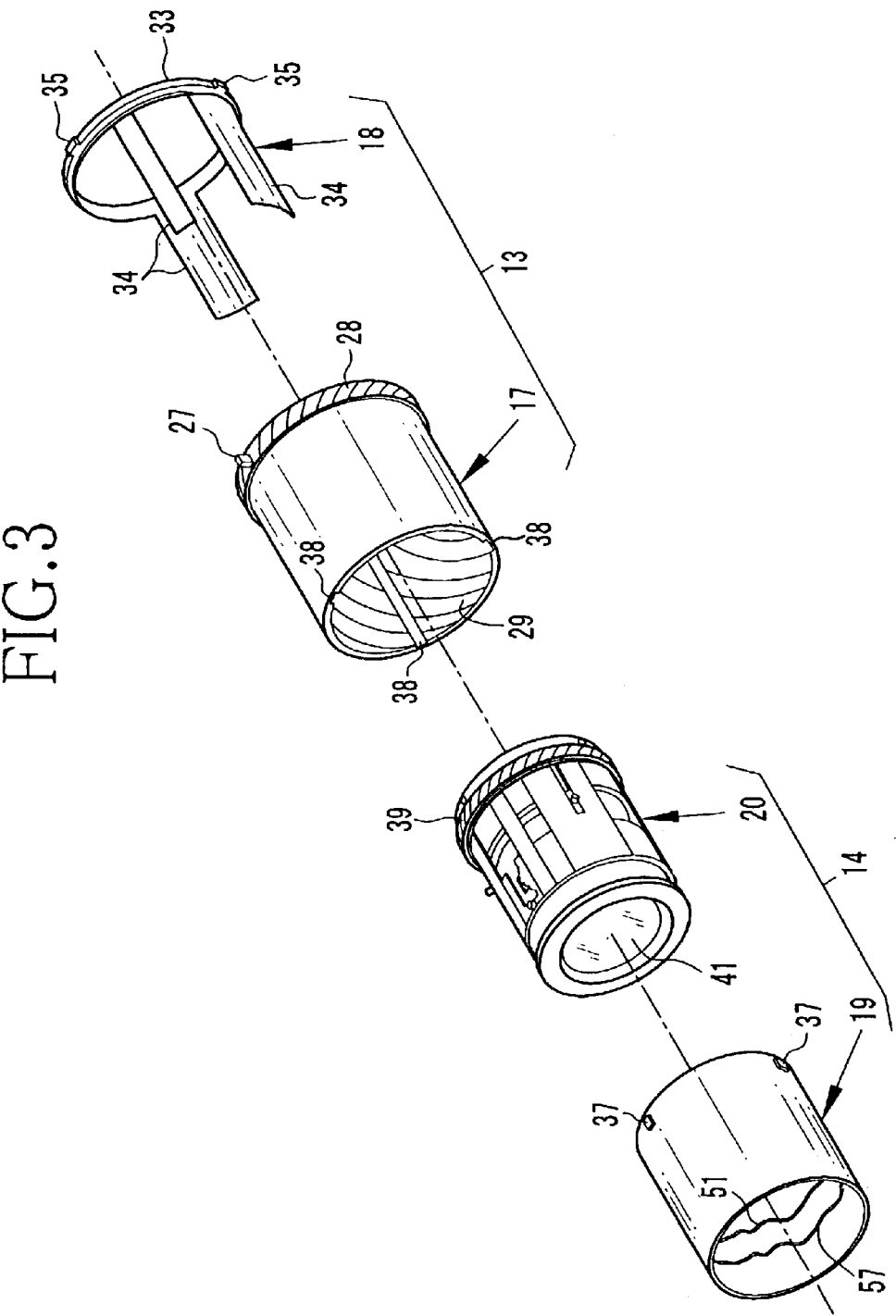
FIG. 3 is an enlarged perspective view of a middle barrel and a front barrel.

Referring to FIG. 3, a male helicoid 28 provided on the rear end of the outer periphery of the middle rotation barrel 17 is in mesh with a female helicoid 30 (referring to FIG. 2) formed in an inner periphery of the straight barrel 15. A key projection 27 provided on an outer surface of the male helicoid 28 is fitted into a groove 32 formed in an inner surface of the rear rotation barrel 16 through a cam groove 31 provided in the straight barrel 15, for the purpose of transmitting rotation of the rear rotation barrel 16 to the middle rotation barrel 17. Thus, the middle rotation barrel 17 forwardly protrudes along the optical axis direction by following a guide of the helicoids 28 and 30, when the rear rotation barrel 16 rotates.

The middle rotation barrel 17 rotatably supports the straight guide frame 18. The straight guide frame 18 comprises a ring shaped frame section 33 and straight guide keys 34 extending from the frame section 33 in the optical axis direction. A projection 35 is formed on an outer periphery of the frame section 33. The projection 35 is fitted into a key groove 36 formed in an inner surface of the straight barrel 15 to prevent rotation of the straight guide frame 18. The straight guide keys 34 are engaged with the moving barrel 20 through the inside of the middle rotation barrel 17. Thus, the straight guide frame 18 prevents rotation of the moving barrel 20 while moving together with the middle rotation barrel 17 in the optical axis direction.

The front rotation barrel 19 is rotatably supported on an outer periphery of the moving barrel 20. Projections 37 are provided on the outer surface of the front rotation barrel 19. The projections 37 are fitted into key grooves 38 formed in the inner surface of the middle rotation barrel 17 to transmit the rotation of the middle rotation barrel 17 to the front rotation barrel 19. A male helicoid 39 is formed on the rear end of the moving barrel 20. The male helicoid 39 is in mesh with the female helicoid 29 formed in the inner surface of the middle rotation barrel 17. Thus, the moving barrel 20 follows the guide of the helicoids 29 and 39 and forwardly protrudes along the optical axis direction while being prevented from rotating by the straight guide frame 18.

Figure 4:
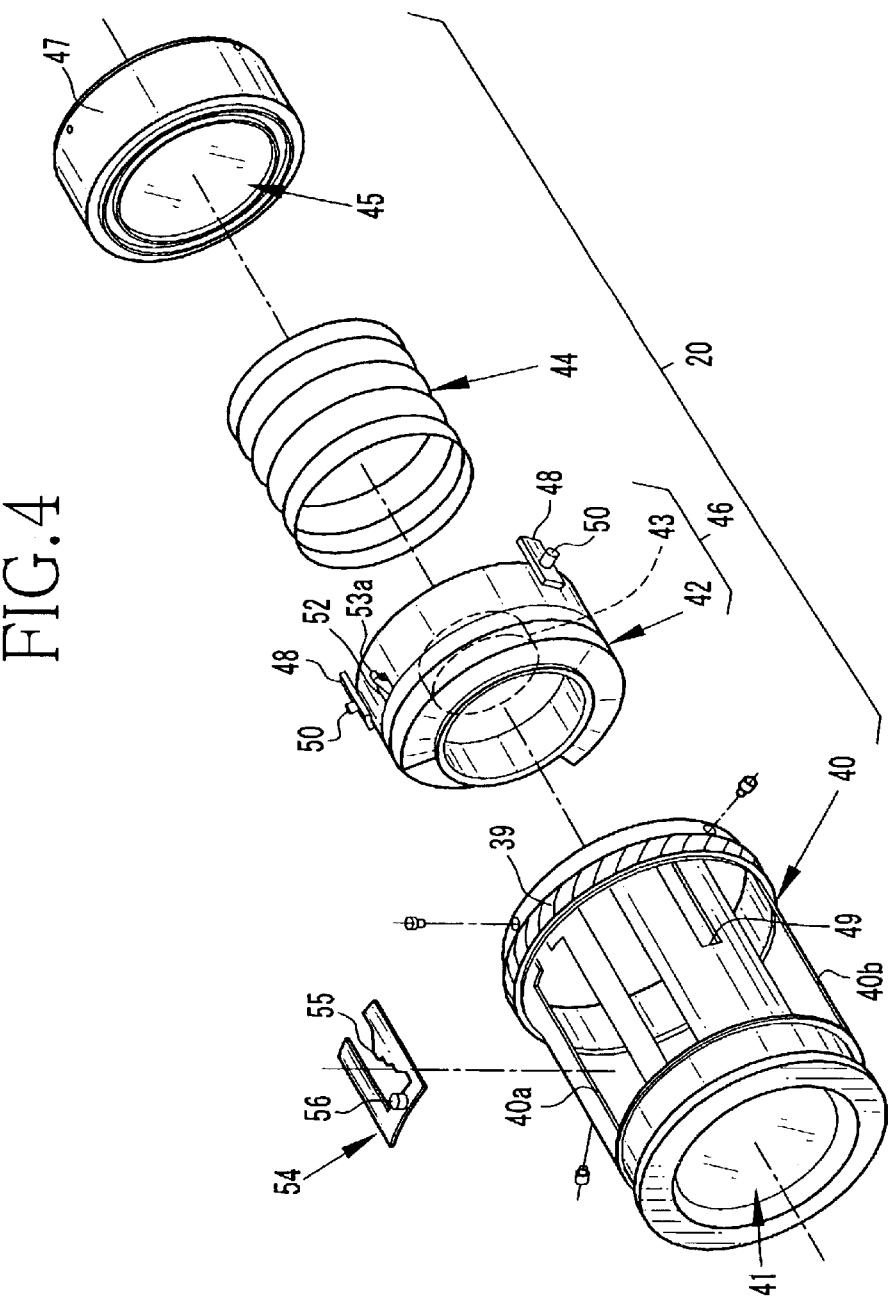
FIG. 4 is an exploded perspective view of a moving barrel.
Figure 5:
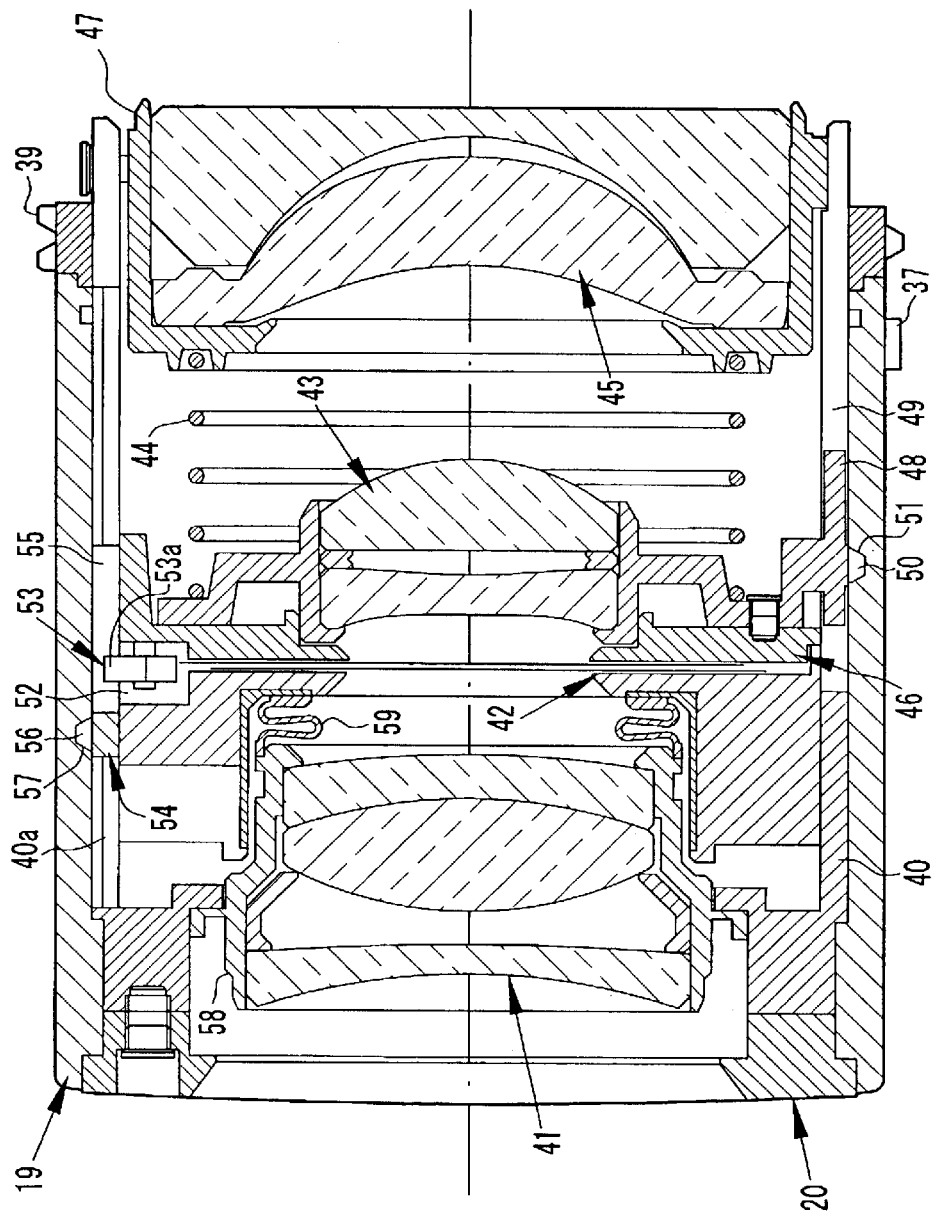
FIG. 5 is a sectional view of the front barrel.

The moving barrel 20, as shown in FIGS. 4 and 5, comprises a holder frame 40, a first lens group 41, a shutter block 42, a second lens group 43, a helical compression spring 44, and a third lens group 45. The first lens group 41, the second lens group 43 and the third lens group 45 compose the zoom-lens optical system. The shutter block 42 contains a program shutter also used as an aperture stop. The first lens group 41 and the third lens group 45 are secured in the front end and the rear end of the holder frame 40 with pins, respectively. The shutter block 42 and the second lens group 43 fixed to each other are hereinafter referred to as a second lens block 46. The second lens block 46 is held between the first lens group 41 and the third lens group 43 in the holder frame 40, and is movable in the optical axis direction. The helical compression spring 44 disposed between the second lens block 46 and a third lens holder 47 holding the third lens group 45 biases the second lens block 46 toward the first lens group 46.

Three straight guide members 48 are provided on the outer surface of the second lens block 46 with approximate rotational symmetry. The straight guide members 48 are fitted into three straight guide openings 49 in order to guide the movement of the second lens block 46 along the optical axis direction. On each of the straight guide members 48, a cam follower is formed. The cam follower 50 is fitted into each of the three cam grooves 51 (referring to FIG. 3), formed in an inner surface of the front rotation barrel 19 to move the second lens group, through the straight guide opening 49. Engagement between the cam grooves 51 and the cam followers 50 moves only the second lens block 46 in the optical axis direction in accordance with the rotation of the front rotation barrel 19. Thus, distances from the second lens block 46 to the first lens group 41, and from the second lens block 46 to the third lens group 45 are varied.

A displacement member 53a of an aperture regulation lever 53 is exposed through an opening 52 formed in an outer surface of the second lens block 46. The displacement member 53a displaced in a direction of the outer periphery of the second lens block 46 regulates the aperture size in accordance with the focal length of the zoom-lens optical system.

There are three cutouts 40b formed in the holder frame 40. The straight guide keys 34 are fitted into the cutouts 40b. An opening 40a is also formed in the holder frame 40 to movably support an approximately U-shaped cam member 54 in the optical axis direction. When the front barrel 14 protrudes from or collapses into the middle barrel 13, the straight guide keys 34 moves in the optical axis direction with getting in the cutouts 40b. In a like manner, the cam member 54 moves inside the opening 40a in the optical axis direction. Therefore, outside light tends to get into the inside of the holder frame 40 through the opening 40a and the cutouts 40b. Accordingly, a light shielding tube 59 formed out of elastic rubber, as shown in FIG. 5, is attached on a rear end of a holder frame 58 for holding the first lens group 41. The light shielding tube 59 expands and contracts in accordance with the movement of the second lens group 43 against the holder frame 40 in order to always keep a space between the first lens group 41 and the second lens group 43 in light shielded condition.

Inside the cam member 54, cam steps 55 are formed with which the displacement member 53a is engaged. The cam steps 55 displaces the displacement member 53a of the aperture regulation lever 53 step-by-step along the direction of the outer periphery of the second lens block 46, in accordance with the movement of the second lens block 46 in the optical axis direction. A cam projection 56 for regulating the aperture size protrudes from a surface of the cam member 54 toward a direction away from the optical axis. The cam projection 56 is fitted into a cam groove 57 for regulating the aperture size formed in an inner surface of the front rotation barrel 19. There are steps formed at both ends in a circumferential direction, and the cam member 54 is fitted on the both ends of the opening 40a from above, so that cam member 54 does not fall into the holder frame 40.

Figure 6:
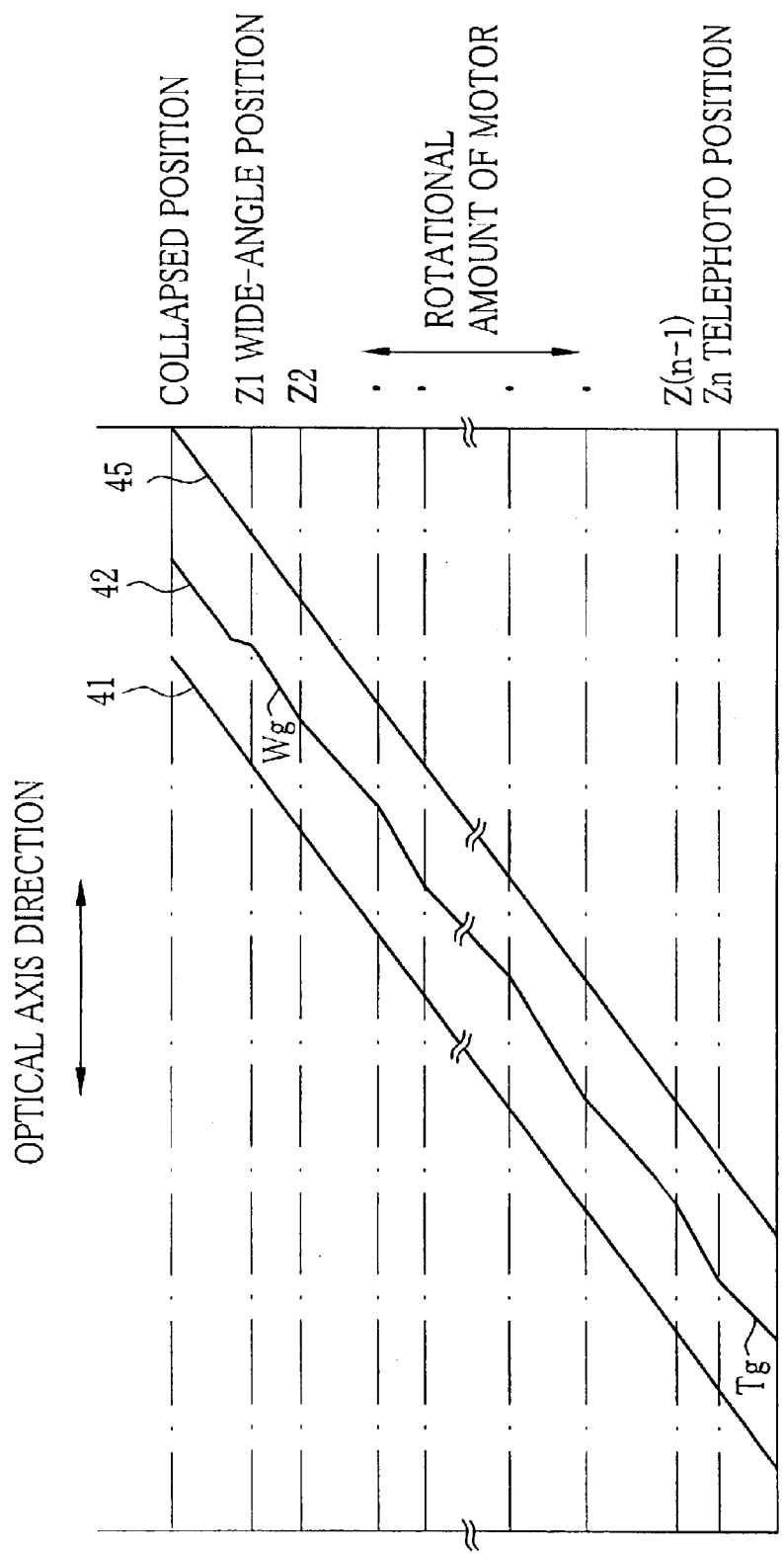
FIG. 6 is a graph showing positions of a first lens group, a shutter block, and a third lens group with respect to a rotational amount of a motor for moving the lens groups.

The zoom-lens optical system, composed of first to third lens groups 41, 43, and 45, moves from a collapsed position to a telephoto position through a wide-angle position in accordance with the amount of rotation of the motor. FIG. 6 is a graph showing variable-power positions of each lens group. The first and third lens groups 41 and 45 linearly move in proportion to a total amount of movement of the rear barrel 12, the middle barrel 13, and the front barrel 14. The second lens group 43 moves along a zigzag course because an amount of movement by the cam groove 51 is added to the total amount of movement of the rear barrel 12, the middle barrel 13, and the front barrel 14. The cam groove 51 for moving the second lens group acts to move the second lens group 43 to plural predetermined variable-power positions, and also acts to vary the distances between the second lens group 43 and the first lens group 41 or between the second lens group 43 and the third lens group 45, in order to actualize a proper focusing position in response to subject distance as to each variable-power position.

Plural variable-power positions Z1 to Zn are predetermined in a range between the wide-angle position and the telephoto position. The focusing position with respect to each variable-power position is predetermined between the present variable-power position and the next variable-power position. When the zoom-lens optical system is at the wide-angle position (Z1) and a user presses a shutter button partially for focusing, for example, the zoom-lens optical system moves to a focusing position which is within the range of Wg between the wide-angle position and the next variable-power position Z2. In a case of the telephoto position (Zn), the zoom-lens optical system moves to a focusing position within the range of Tg by further rotating the motor in a forward direction from the telephoto position.

Figure 7:
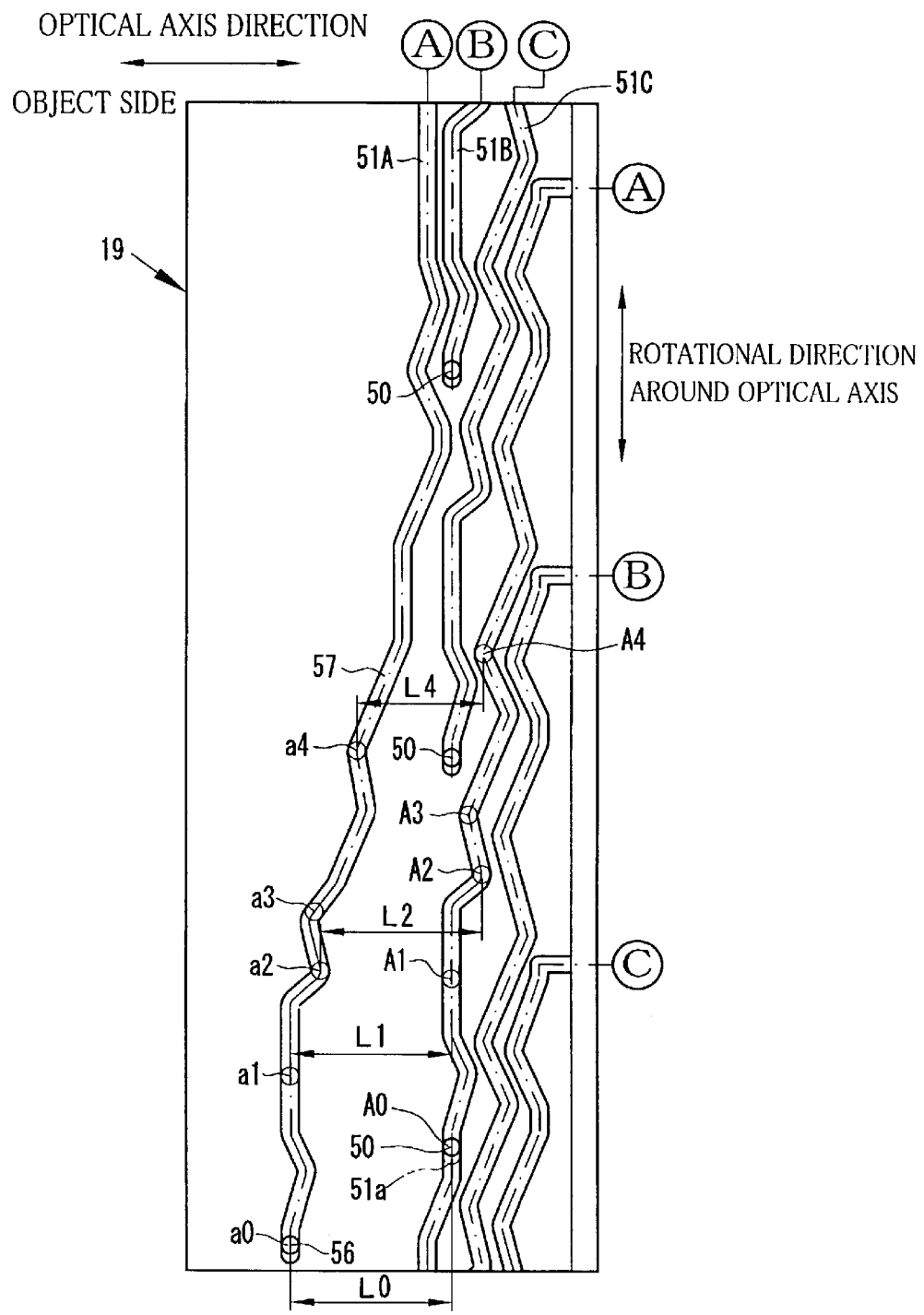
FIG. 7 is an exploded view showing an inner surface of a front rotation barrel, in which a cam groove for regulating an aperture size and cam grooves for moving a second lens group are formed.

Referring to FIG. 7, three cam grooves 51A to 51C for moving the second lens group 43 are formed in the front rotation barrel 19. These cam grooves 51A to 51C having the same shape are shifted by 120 degrees in position from one another along a rotational direction around the optical axis. The cam followers 50 provided in the second lens block 46 are fitted into the cam grooves 51A to 51C. A cam groove 57, into which a cam projection 56 for regulating the aperture size is fitted, is formed next to the cam grooves 51A to 51C in the front rotation barrel 19.

When the zoom-lens optical system is in the collapsed position, the cam follower 50 for moving the second lens group 43 is at the position A0 in the cam groove 51A, and the cam projection 56 for regulating the aperture size is at the position a0 in the cam groove 57. Upon zooming the zoom-lens optical system to the telephoto position, the front rotation barrel 19 moves in a downward direction of FIG. 7. The shutter block 42 and the second lens group 43 move together. When the zoom-lens optical system is in the wide-angle position (Z1), the variable-power position Z2 and the variable-power position Z4, for example, the cam follower 50 for moving the second lens block moves to positions A1, A2 and A4 in the cam groove 51A, and the cam projection 56 for regulating the aperture size moves to positions a1, a2 and a4 in the cam groove 57, respectively. In this way, the cam followers 50 and the cam projection 56 move along the rotational direction around the optical axis while remaining a predetermined distance away from one another. Then, distances from the cam follower 50 to the cam projection 56 in the optical axis direction are L1, L2 and L4, respectively. When the zoom-lens optical system moves from a variable-power position Zi to the next variable-power position Z(i+1), an amount of displacement of the cam member 54 against the displacement member 53a is expressed as |Li−L(i+1)|. In other words, the cam groove 57 includes the amount of displacement of the cam member 54 for regulating the aperture size by displacement of the displacement member 53a, and the amount of the movement of the second lens group 43 moving in the optical axis direction against the holder frame 40.

The cam groove 57 for regulating the aperture size has the same shape as the cam grooves 51A to 51C in rotational areas for moving the second lens group 43 to a focusing position. In other words, when the second lens group 43 moves to the focusing position after zooming, the cam member 54 also moves together with the second lens group 43 in the optical axis direction while maintaining the predetermined distance from the second lens group 43. So, the aperture size regulated in the variable-power position is maintained in the focusing position. In this way, the aperture size is varied only during movement to the variable-power position, and not varied during movement to the focusing position. The cam groove 57 for regulating the aperture size is connected to an end 51a of the cam groove 51A for moving the second lens group 43. Thus, it is possible to shorten the length of the front rotation barrel 19 in comparison with a case where four cam grooves are formed side by side in the inner surface of the front rotation barrel 19 along the optical axis direction. In assembling the front rotation barrel 19 and the moving barrel 20, the cam projection 56 may be first inserted into the cam groove 57. After the front rotation barrel 19 is rotated 360 degrees, the three cam followers 50 may be inserted into the cam grooves 51A to 51C.

Figure 8:
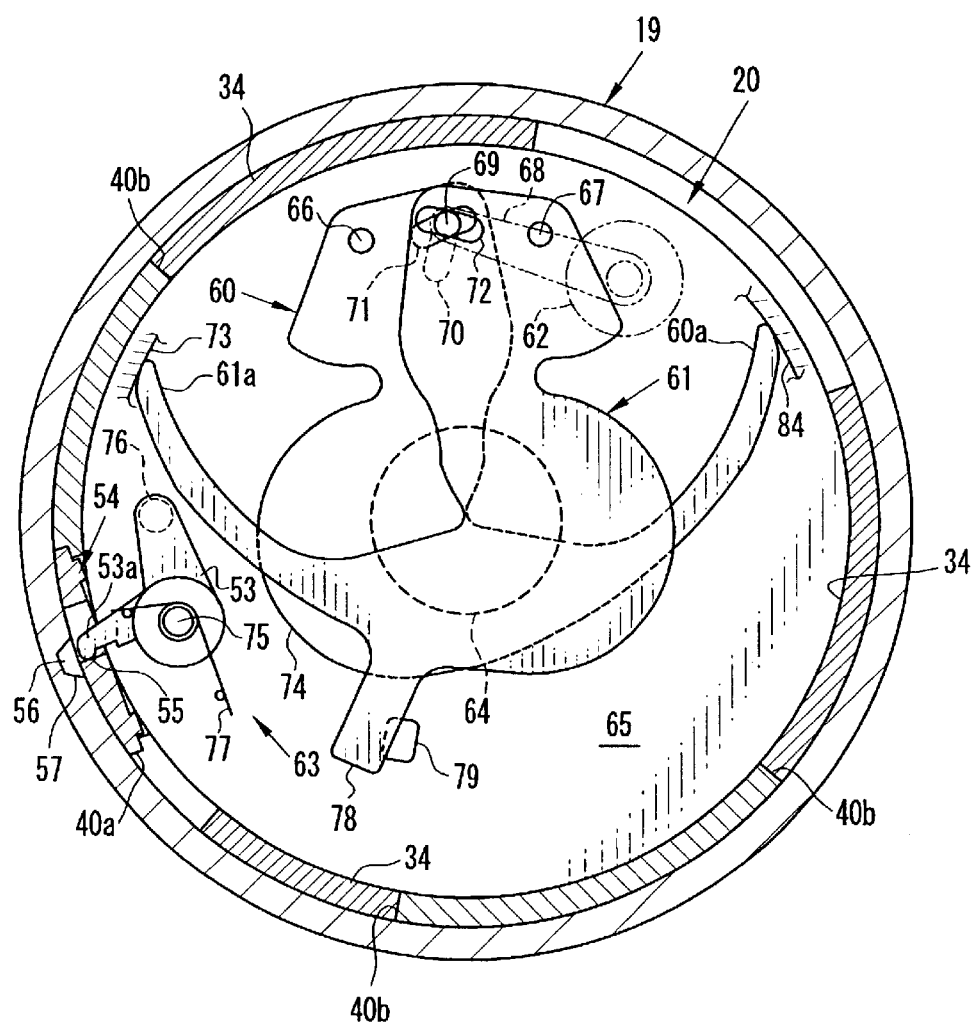
FIG. 8 is a plan view of a shutter mechanism viewed from an image plane side when a shutter opening is closed.

Referring to FIG. 8, a shutter mechanism contained in the shutter block 42 includes two shutter blades 60 and 61 attached to a shutter board 65 in which a shutter opening 64 is formed, a moving-magnet motor 62, an aperture regulation member 63 and the like. The moving-magnet motor 62 fixed on one surface of the shutter board 65 rotates an output shaft by predetermined degrees in a clockwise or counterclockwise direction in accordance with a current direction flow of an embedded coil. Pivots 66 and 67 for rotatably holding the shutter blades 60 and 61 are provided on the other surface of the shutter board 65.

Figure 9:
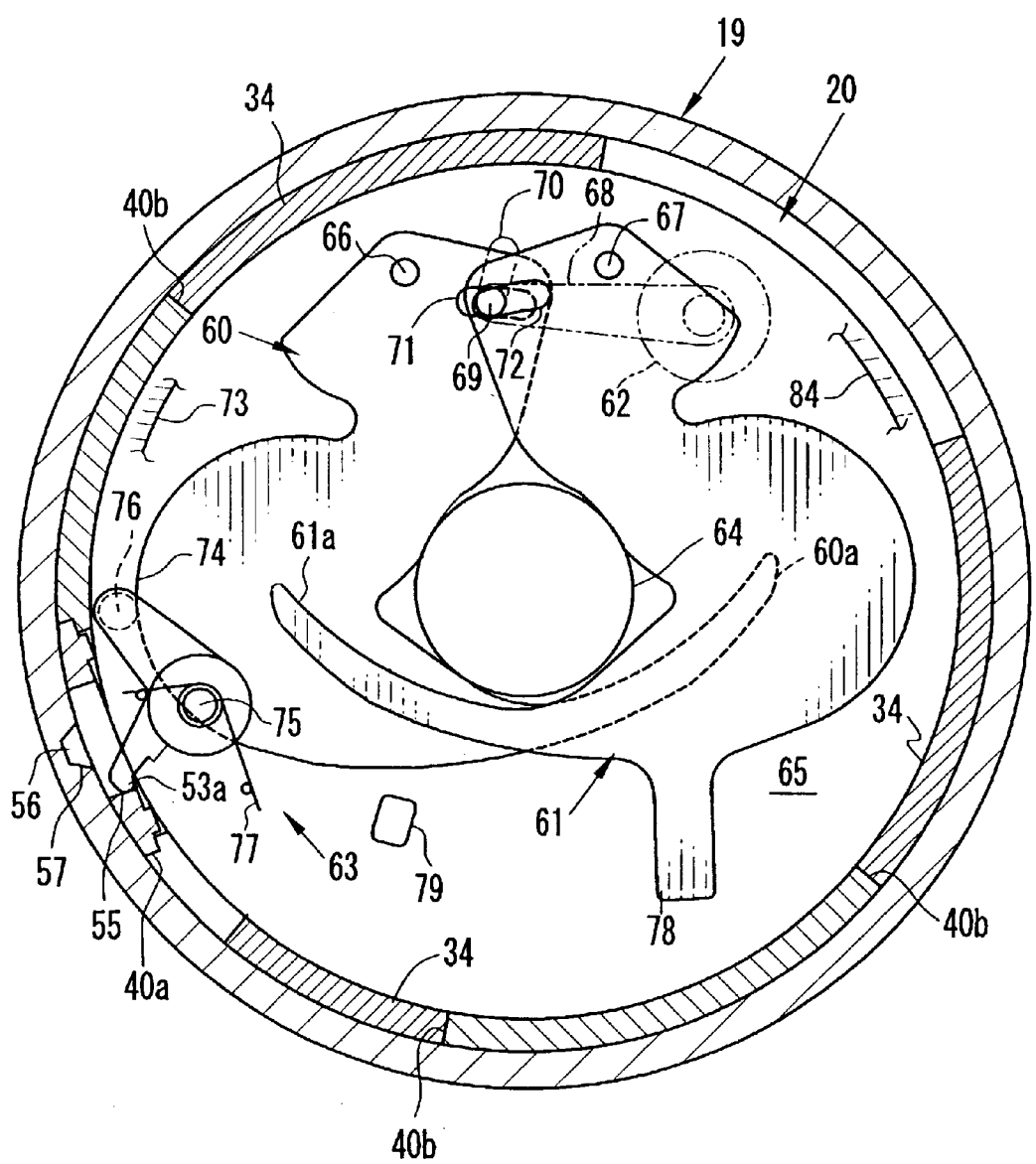
FIG. 9 is a plan view of the shutter mechanism viewed from the image plane side when the shutter opening is open.

An end of a drive lever 68 is secured to the output shaft of the motor 62. On the other end of the drive lever 68, a drive pin 69 is formed. The drive pin 69 is fitted into engaging holes 71 and 72 provided in the shutter blades 60 and 61 through an elliptic hole 70 in the shutter board 65. Movement of the driving pin 69 rotates the shutter blades 60 and 61 between a closed position in which the shutter blades 60 and 61 overlap each other in front of the shutter opening 64 to close the shutter opening 64, and an open position shown in FIG. 9 in which the shutter opening 64 is fully exposed. Ends 60a and 61a of the shutter blades 60 and 61, as shown in FIG. 8, bump stoppers 73 and 84 provided on the shutter board 65 to keep the shutter blades 60 and 61 in the closed position.

The aperture regulation member 63 for regulating the aperture size comprises the aperture regulation lever 53 bumped on an edge 74 of the shutter blade 60, and the cam member 54. A main portion of the L-shaped aperture regulation lever 53 is rotatably attached to a mounting shaft 75 provided on the shutter board 65. A regulating pin 76 which gets in orbit of the shutter blade 60 is provided on one end of the aperture regulation lever 53, and the displacement member 53a is formed in the other end.

The regulating pin 76 bumps on the edge 74 of the shutter blade 60 to regulate the amount of rotation of the shutter blades 60 and 61. The displacement member 53a protrudes outside from the opening 52 formed in the shutter block 42. A torsion coil spring 77 biases the aperture regulation lever 53 toward a direction in which the displacement member 53a makes contact with the cam steps 55 of the cam member 54.

The shutter blade 61 has a cover member 78. The cover member 78 constitutes a mechanism for detecting a shutter operation time with a photo sensor 79. The photo sensor 79 is disposed at a position where the cover member 79 crosses an optical path of the photo sensor 79 just before the shutter blades 60 and 61 form the aperture in front of the shutter opening 64.

Figure 10:
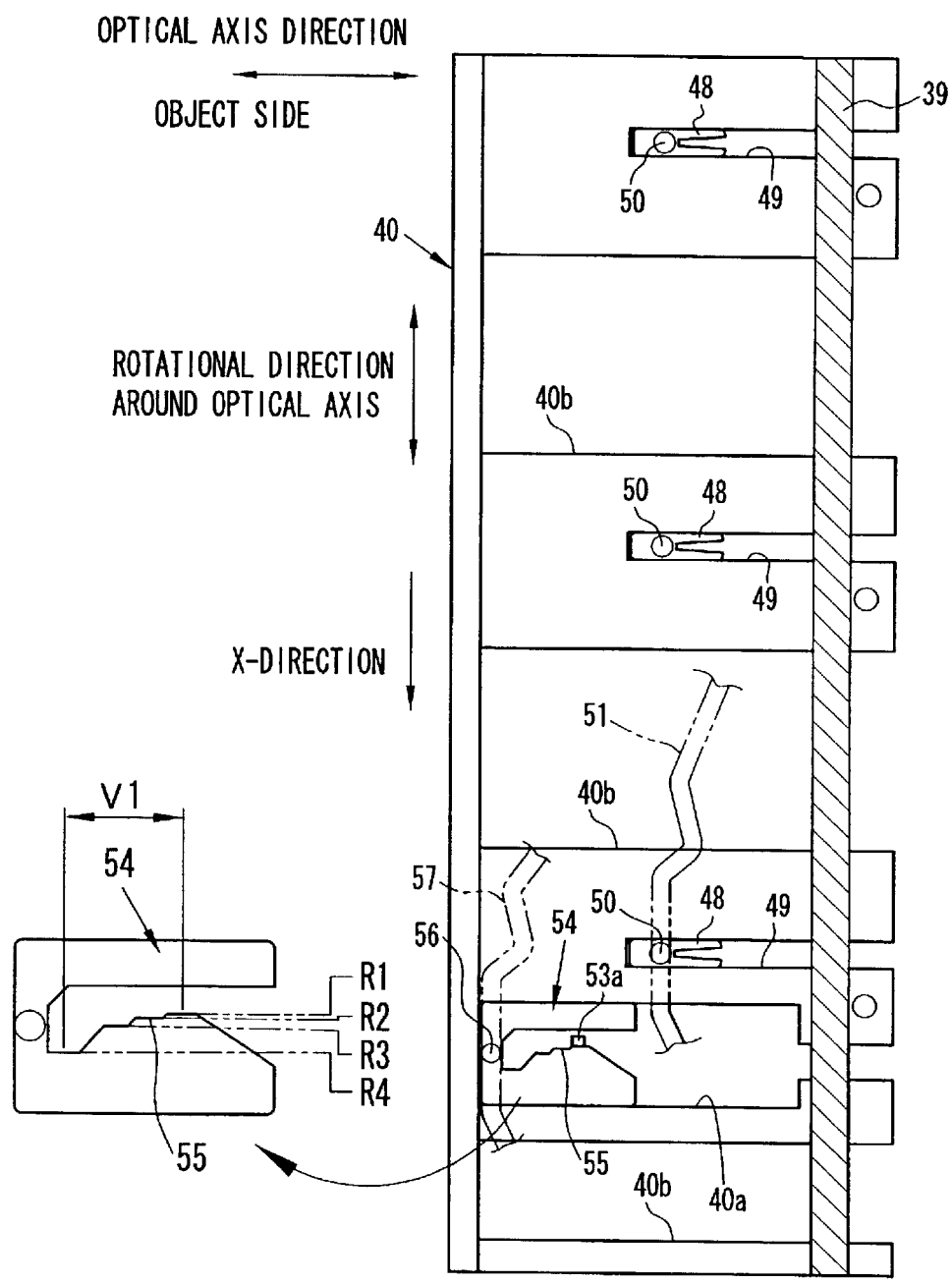
FIG. 10 is an exploded view showing an outer surface of the moving barrel.

Referring to FIG. 10, there are four cam steps 55 for displacing the displacement member 53a in the cam member 54. The spring 77 biases the displacement member 53a toward the X direction which is one of the rotational directions around the optical axis. The cam member 54 is disposed in such a manner that the steps thereof are opposed to a direction of bias of the displacement member 53a. When the zoom-lens optical system is in the collapsed position, the cam member 54 is positioned at a left end (an object side) of the opening 40a shown in FIG. 10. In this time, the cam member 54 holds the displacement member 53a at an initial position R1 against the bias of the spring 77. When the zoom-lens optical system moves to the telephoto position, the cam member 54 moves to a right side in the drawing and holds the displacement member 53a at a position R4 against the bias of the spring 77. The cam member 54 displaces the displacement member 53a among the positions from R1 to R4, so that a maximum travel distance of the cam member 54 against the second lens block 46 is V1, a length of the cam steps 55 along the optical axis direction. When the displacement member 53a is in a position R4, the aperture regulation member 63 allows the shutter blades 60 and 61 to rotate to the open position. When the displacement member 53a is displaced from the position R4 to R3, R2, and R1 in such order, the aperture regulation lever 53 rotates in the clockwise direction of FIG. 9, in order to gradually regulate rotational range of the shutter blades 60 and 61 in such a manner that a diameter of the aperture formed by the shutter blades 60 and 61 becomes smaller than that of the shutter opening 64.

Figure 11:
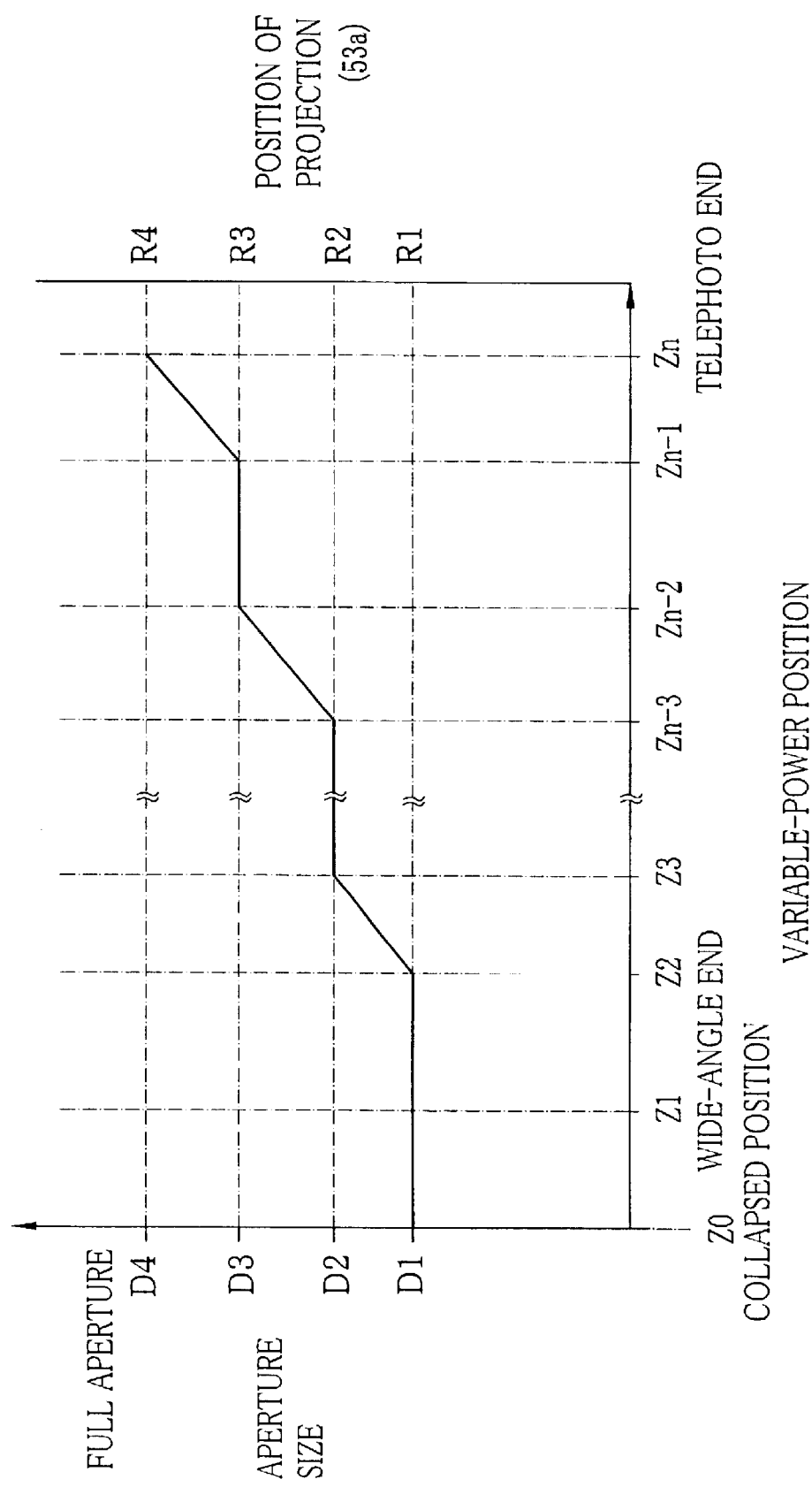
FIG. 11 is a graph showing relation between a variable-power position of the zoom-lens barrel and the aperture size.

Referring to FIG. 11, when the zoom-lens optical system moves in range from the collapsed position (Z0) to the variable-power position Z2, the displacement member 53a of the aperture regulation lever 53 is held at the position R1. At this time, an aperture has the smallest size D1. In response to movement of the zoom-lens optical system from the variable-power position Z2 to the telephoto position (Zn), the displacement member 53a is gradually displaced to the position R2 and R3 in this order, so the aperture regulation lever 53 is rotated toward the counterclockwise direction of FIG. 9. When the zoom-lens optical system is in the telephoto position, the displacement member 53*a* moves to the position R4, and the aperture regulation lever 53 is positioned farthest to the counterclockwise direction. At this time, the aperture has the largest aperture size D4. In this way, it is possible to gradually change the aperture size formed by the shutter blades 60 and 61 in whole travel range of the zoom-lens optical system.

Figure 12:
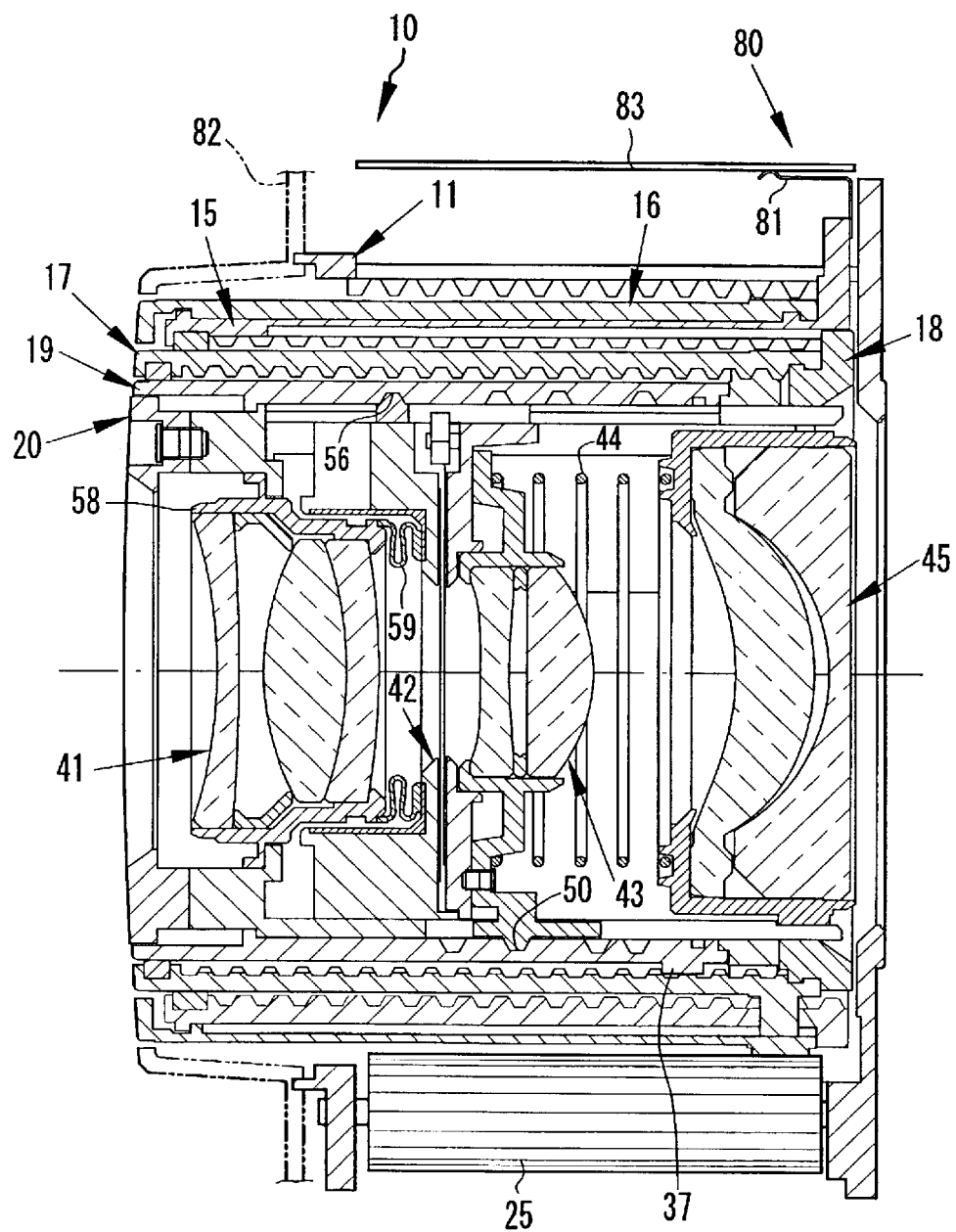
FIG. 12 is a sectional view of the zoom-lens barrel in a collapsed position.
Figure 13:
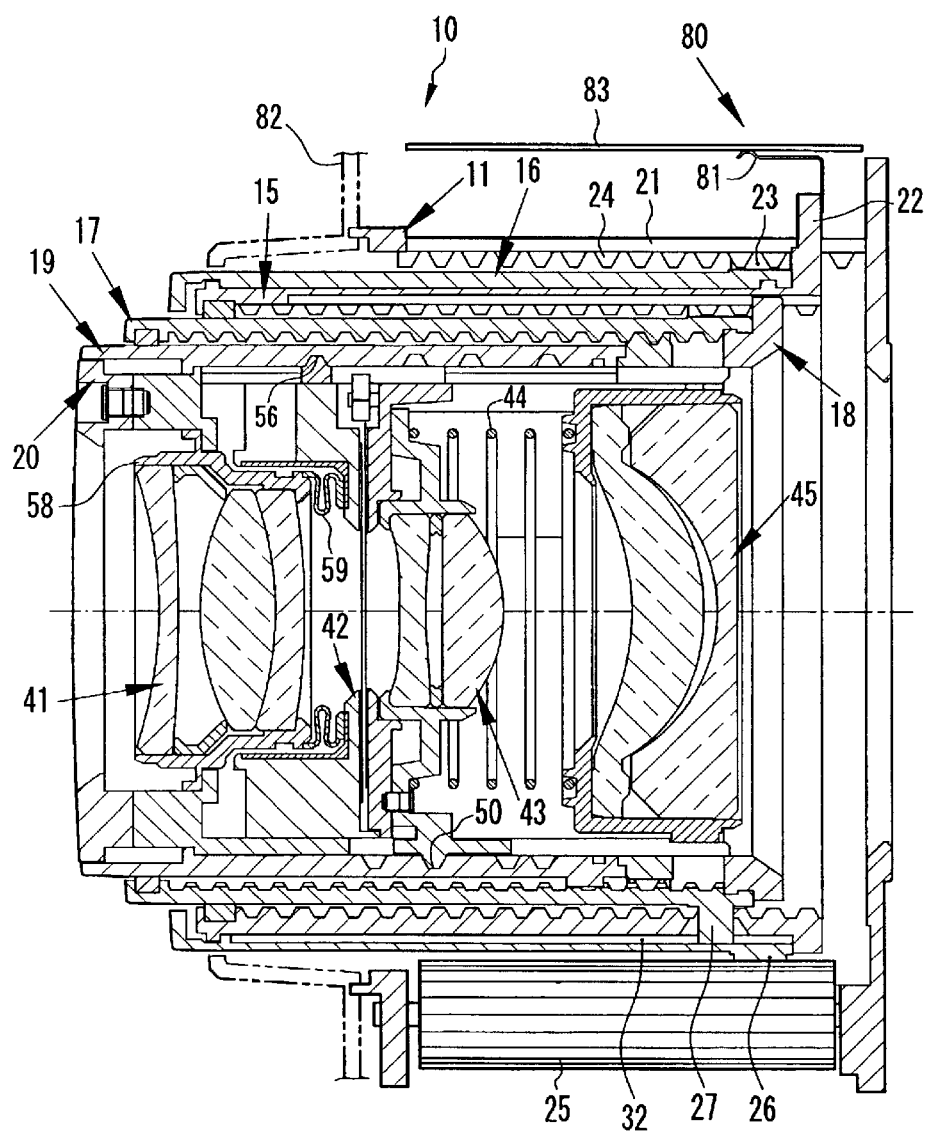
FIG. 13 is a sectional view of the zoom-lens barrel in a wide-angle position.
Figure 14:
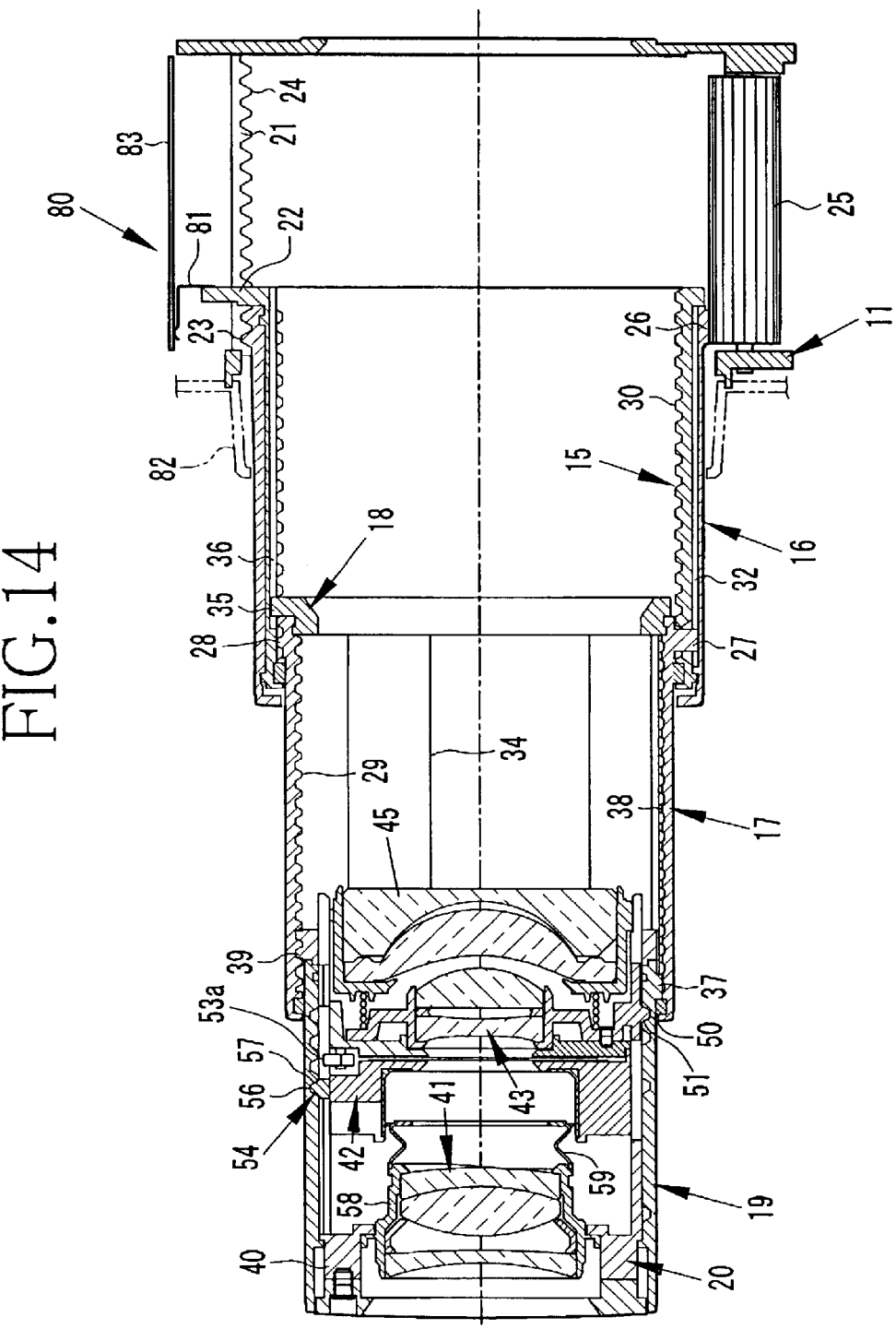
FIG. 14 is a sectional view of the zoom-lens barrel in a telephoto position.

Referring to FIGS. 12 to 14, the zoom lens barrel 10 has a detecting device 80 for a variable power position. The variable-power position detecting device 80 includes a slider 81 provided on the straight barrel 15 and a code board 83 fixed on the fixed barrel 11. The detecting device 80 obtains a code corresponding to the variable-power position of the zoom lens 10 from the code board 83 by a slide of the slider 81 on the code board 83. Based on the code, a focal length of the zoom-lens optical system is determined.

Figure 15:
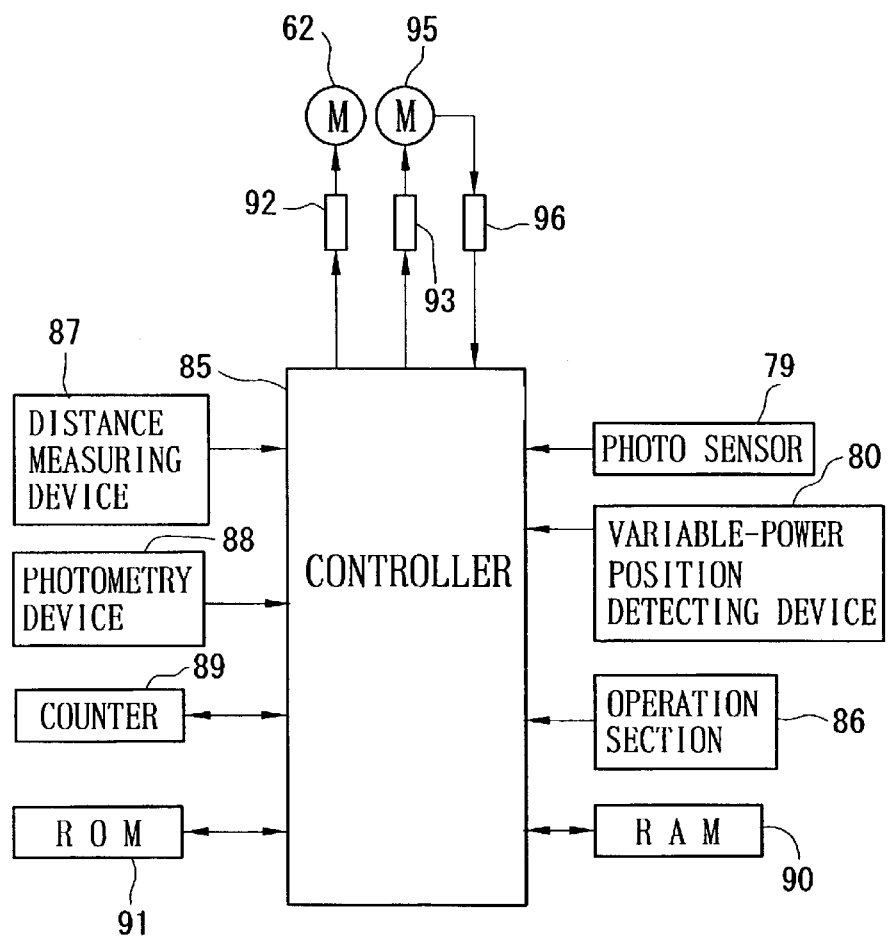
FIG. 15 is a block diagram showing an electric configuration of a camera with the zoom-lens barrel.

A controller 85 of a camera with the zoom-lens barrel 10, as shown in FIG. 15, is connected to an operation section 86, the photo sensor 79, the variable-power position detecting device 80, a distance measuring device 87, a photometry device 88, a counter 89, a RAM 90, and a ROM 91. The controller 85 is also connected to the moving-magnet motor 62 and a motor 95 for moving the lens groups via drivers 92 and 93, respectively.

The counter 89 counts operation time of the shutter blades 60 and 61 on the basis of signals obtained from the photo sensor 79. The ROM 61 stores data on the operation time corresponding to a combination of the variable-power position and subject brightness, and data on the movement of the second lens group 43 corresponding to a combination of the variable-power position and the subject distance. The RAM 90 temporarily stores the subject distance obtained from the measuring device 87, the subject brightness obtained from a photometry value, the operation time data of the shutter blades 60 and 61 read out from the ROM 91, and the like. The operation section 86 includes a power source button, a shutter button, a zoom operation member, and the like.

An encoder 96 is connected to the motor 95 for moving the lens groups. The encoder 96 outputs predetermined pulses in response to a rotational angle of the output shaft of the motor 95. The controller 85 counts the pulses and controls drive of the motor 95 in focusing. A conversion table is stored on the ROM 91 in advance which indicates the number of pulses corresponding to the movement of the second lens group 43 in accordance with the subject distance in each variable-power position.

Operation of the zoom-lens barrel 10 with the aperture regulating apparatus according to the present invention will be hereinafter described. At first, the zoom-lens optical system is in the collapsed position shown in FIG. 12 in which the rear barrel 12, the middle barrel 13, and the front barrel 14 are contained in a camera body 82. Upon turning on the power source button in the operation section 86, the motor 95 for moving the lens groups is driven, and the rear barrel 12, the middle barrel 13, and the front barrel 14 sequentially protrudes in the forward direction along the optical axis. The controller 85 monitors signals from the variable-power position detecting device 80 during drive of the motor 95, and stops the drive of the motor 95 in response to the detection signal corresponding to the wide-angle position. Thus, the zoom-lens optical system is stopped at the wide-angle position shown in FIG. 13.

The zoom-lens optical system is moved to any of the plural variable-angle positions from the wide-angle position to the telephoto angle position, in response to operation from the zoom operation member in the operation section 86. FIG. 14 shows the zoom-lens barrel 10 in the telephoto position.

Since the rotation of the motor 95 is transmitted to the rear rotation barrel 16 via the longitudinal gear 25, the rear rotation barrel 16 protrudes in the optical axis direction with rotation against the fixed barrel 11, by following the guide of the male and female helicoids 23 and 24. The rear rotation barrel 16 moves while holding the straight barrel 15 in the inside thereof. The straight barrel 15 moves straight in the optical axis direction without rotating because the fixed barrel 11 prevents its rotation.

The rotation of the rear rotation barrel 16 is transmitted to the middle rotation barrel 17 due to engagement between the key groove 32 and the key projection 27. Upon transmission of the rotation, the middle rotation barrel 17 protrudes against the straight barrel 15 with rotation by following the guide of the male and female helicoids 28 and 30. At this time, the middle rotation barrel 17 moves while holding the straight guide frame 18 in the inside thereof. The straight guide frame 18 moves straight in the optical axis direction without rotating because the straight barrel 15 stops its rotation.

Upon rotation of the middle rotation barrel 17, the moving barrel 20 moves straight in accordance with the middle rotation barrel 17 by following the guide of the male and female helicoids 39 and 29. The rotation of the middle rotation barrel 17 is also transmitted to the front rotation barrel 19. The front rotation barrel rotates in synchronization with the drive of the motor 95 on the outer periphery of the moving barrel 20, while moving together with the moving barrel 20. Accordingly, the cam 51 for moving the lens groups moves the second lens group 43 toward the optical axis direction within the holder frame 40, the cam groove 57 moves the cam member 54 toward the optical axis direction on the opening 40*a* of the holder frame 40. Thus, the cam member 54 moves, and the displacement member 53*a* is displaced to any of the positions from R1 to R4. The amount of displacement of the displacement member 53*a* is equal to the amount of displacement of the cam member 54 in the optical axis direction minus that of the second lens group 43. The aperture regulation lever 53 rotates in accordance with displacement of the displacement member 53*a*, so an amount of insertion of the regulating pin 76 into the operational orbit of the shutter blade 60 is changed. Therefore, rotational range of the shutter blade 60 is controlled.

In photography, the controller 85 activates the distance measuring device 87 and the photometry device 88 in response to a half press of the shutter button. The amount of movement of the second lens group 43 is read out from the ROM 91 in accordance with the combination of the variable-power position and the subject distance. The motor 95 is driven by the motor pulses corresponding to the amount of movement of the second lens group 43. Thus, the first to third lens groups 41, 43, and 45 move in the optical axis direction, and the second lens group 43 further moves to change the distances between the second lens group 43 and the first lens group 41, and between the second lens group 43 and the third lens group 45.

Then, the controller 85 activates the shutter mechanism in response to a full press of the shutter button. The controller 85 read out exposure time corresponding to the variable-power position and the subject brightness from the ROM 91, and memorizes it on the RAM 90. Then, the controller 85 drives the motor 62 for a shutter to make an expose on the basis of the predetermined exposure time. The controller 85 monitors the movement of the shutter blades 60 and 61 via the photo sensor 79, so the actual operation time of the shutter blades 60 and 61 is counted by the counter 89 and input in the controller 85.

Figure 16:
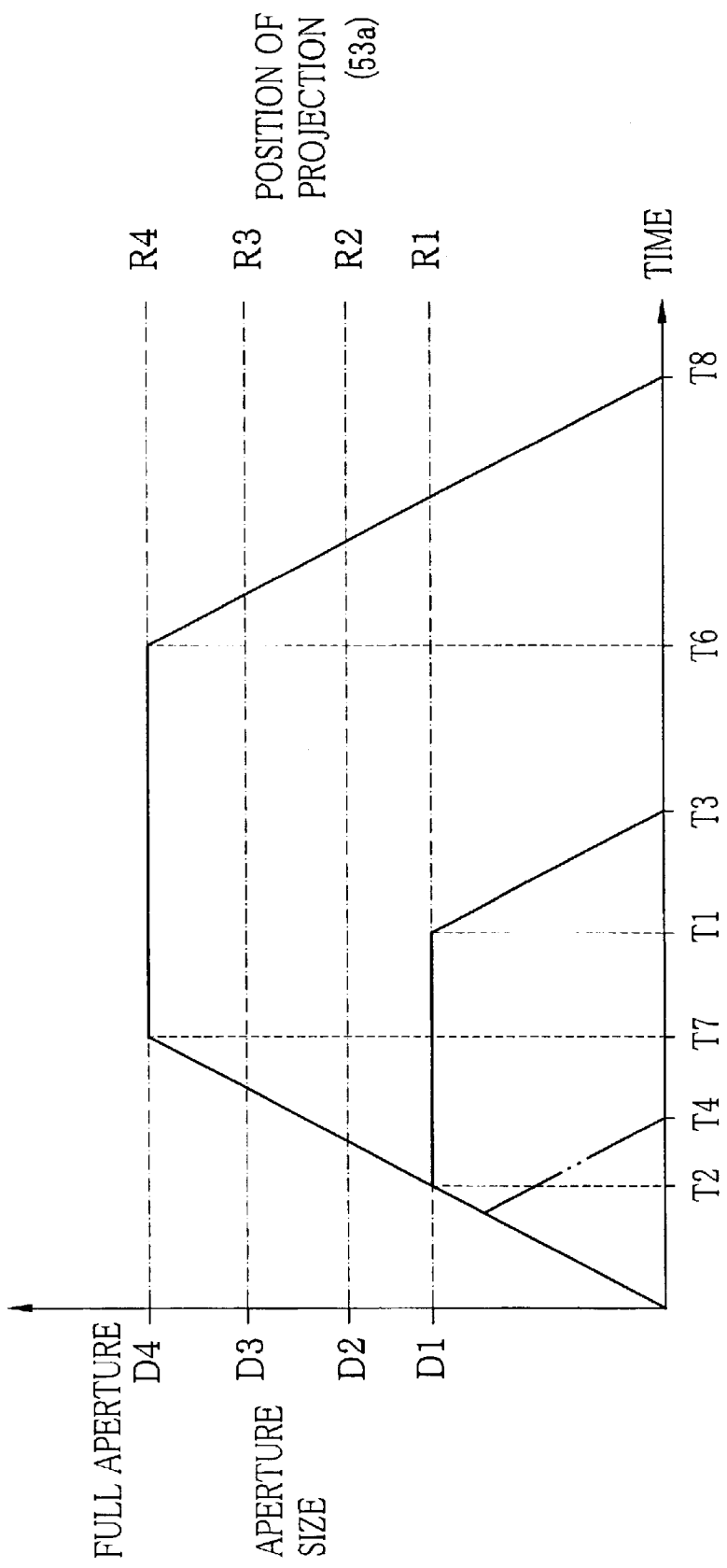
FIG. 16 is a graph showing the relationship between the aperture size and the operation time of the shutter blades.

The displacement member 53a is displaced among the four steps, namely from the position R1 to R4, in accordance with the variable-power position of the zoom-lens optical system. When the zoom-lens optical system is in the wide-angle position (Z1), the displacement member 53a is positioned at R1. Referring to FIG. 16, the shutter blades 60 and 61 form an aperture with the smallest aperture size D1 at this time. When the operation time of the shutter blades 60 and 61 corresponding to the variable-power position and the subject brightness shall be T1, the edge 74 of the shutter blade 60 bumps on the regulating pin 76 at a time T2 to regulate the aperture size at D1.

When a time counted by the counter 89 becomes equal to the operation time T1 of the shutter blades 60 and 61 corresponding to the variable-power position and the subject brightness, the controller 85 reverses a direction of current flowing through the coil of the motor 62. Thus, the motor 62 rotates in an opposite direction to rotate the shutter blades 60 and 61 to the closed position. At a time T3, the shutter opening 64 is completely closed. An exposure amount in the wide-angle position is proportionate to an area surrounded by a line passing through times T2, T1 and T3 of FIG. 16 and a horizontal axis (a time axis).

In a case where the subject has high brightness, as shown in FIG. 16, the shutter blades 60 and 61 may be closed at a time T4, though an aperture size therein does not reach the aperture size D1 of the wide-angle position.

The aperture size regulated by the aperture regulation member 63 gradually becomes larger in cooperation with zooming of the zoom-lens barrel 10 from the wide-angle position to the telephoto position.

In the telephoto position, the aperture has the largest aperture size D4 in which the shutter opening 64 is fully exposed, because the displacement member 53a moves to the position R4. When the operation time of the shutter blades 60 and 61 in the telephoto position corresponding to the variable-power position and the subject brightness shall be T6, the edge 74 of the shutter blade 60 bumps on the regulating pin 76 at a time T7 and the shutter opening 64 is fully exposed. When a time counted by the counter 89 becomes T6, the shutter blades 60 and 61 start rotating to a closing direction, and return to the closed position at a time T8.

In this way, the aperture size in the wide-angle position is smaller than that in the telephoto position, so that it is possible to reliably prevent blurriness of the edge of an image field due to spherical aberration of the zoom-lens optical system in the wide-angle position.

In the above embodiment, the zoom-lens barrel 10 has three barrels moving back and forth along the optical axis direction, namely the rear barrel 12, the middle barrel 13, and the front barrel 14. However, the zoom-lens barrel may have two barrels, the middle barrel 13 and the front barrel 14, or may have only the front barrel 14. Also the present invention can be applicable to a taking lens of a double focus changeover type.

In the above embodiment, the aperture regulation lever 53 rotates about the mounting shaft 75 erect in parallel with the optical axis. However, the aperture regulation lever may rotate about a shaft erect in a direction intersecting the optical axis. In this case, the cam member 54 may have cam steps 55 which displace the displacement member 53a toward the optical axis direction.

In the above embodiment, there are two shutter blades, but there may be more than three. In this case, a regulating pin may be provided in a rotational orbit of a center ring which simultaneously operates the plural shutter blades. Rotational amount of the center ring is regulated by bumping the regulating pin on a part of the center ring.

In the above embodiment, there are cam grooves for moving the second lens group formed in the front rotation barrel, but the cam grooves may be omitted. In this case, the moving barrel has a motor to move the second lens group. According to this way, any position in range of movement of the zoom-lens barrel can be used as a variable-power position. In the above embodiment, the cam member 54 has the cam steps 55 to displace the displacement member 53a step-by-step, but may have the cam step to continually displace the displacement member.

What is claimed is:

1. An aperture regulating apparatus for changing an aperture size in accordance with a magnifying power of a taking lens optical system, said aperture size being determined by an amount of movement of shutter blades moving within a vertical plane to an optical axis of said taking lens optical system, said aperture regulating apparatus comprising:

a moving barrel that moves straight in the direction of said optical axis in response to magnifying operation of said taking lens optical system;

a rotation barrel movably held by said moving barrel, said rotation barrel moving in said optical axis direction with rotation in cooperation with the straight movement of said moving barrel;

a cam member fitted on an outer surface of said moving barrel, said cam member moving straight in said optical axis direction relative to said moving barrel in accordance with rotation of said rotation barrel;

a shutter unit for holding said shutter blades, said shutter unit being contained inside said moving barrel; and a regulation lever engaged with said cam member, said regulation lever regulating movement of said shutter blades by being displaced in accordance with movement of said cam member in order to change said aperture size.

2. An aperture regulating apparatus as recited in claim 1, wherein a first cam groove is formed in the inner surface of said rotation barrel, said cam member has a projection fitted into said first cam groove, and said cam member moves in said optical axis direction when said rotation barrel rotates.

3. An aperture regulating apparatus as recited in claim 2, wherein plural cam steps are formed in said cam member, and the position of said regulation lever is regulated within plural steps depending on the position of said cam member against said moving barrel.

4. An aperture regulating apparatus as recited in claim 2, wherein said aperture regulating apparatus further comprises:

at least one second cam groove formed in an inner surface of said rotation barrel;

at least one guide opening formed in a periphery of said moving barrel along said optical axis direction; and at least one cam follower provided in said shutter unit, said cam follower being fitted into said second cam groove through said guide opening, thereby said shutter unit shifts in said optical axis direction when said rotation barrel rotates.

5. An aperture regulating apparatus as recited in claim 4, wherein said first cam grove and said second cam groove are connected with each other in said inner surface of said rotation barrel.

6. An aperture regulating apparatus as recited in claim 4, wherein three of said second cam grooves are formed in substantially rotational symmetrical positions.

7. An aperture regulating apparatus as recited in claim 2, wherein said aperture size is kept constant during focusing operation of said taking lens optical system.

8. An aperture regulating apparatus as recited in claim 7, wherein said taking lens optical system comprises a lens group moving in said optical axis direction together with said shutter unit, said shutter unit moves in said optical axis direction with keeping distance from said cam member during said focusing operation of said taking lens optical system, so that the position of said lens group is changed in said taking lens optical system.

9. An aperture regulating apparatus as recited in claim 1, wherein said regulation lever is movably held inside said shutter unit, a first end of said regulation lever protruding outside from said shutter unit is engaged with said cam member, said regulation lever rotates within said vertical plane to said optical axis direction when said cam member moves in said optical axis direction.

10. An aperture regulating apparatus as recited in claim 9, wherein a second end of said regulation lever gets in range of movement of said shutter blade, the position of said second end is changed in accordance with the amount of rotation of said regulation lever to control the amount of rotation of said shutter blades.

* * * * *